April 26, 1960 F. F. DAUENHAUER 2,934,152
HELICOPTER LIFT ROTOR CONTROLS
Filed April 16, 1956 4 Sheets-Sheet 2
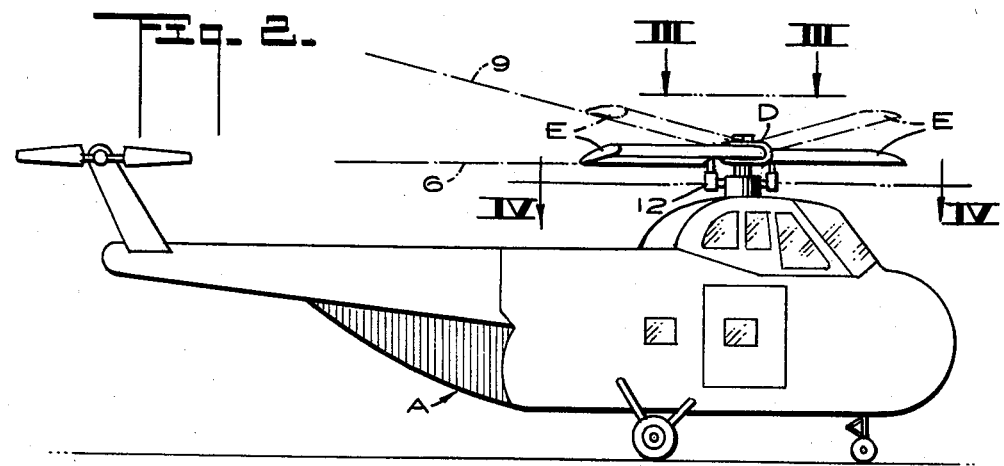
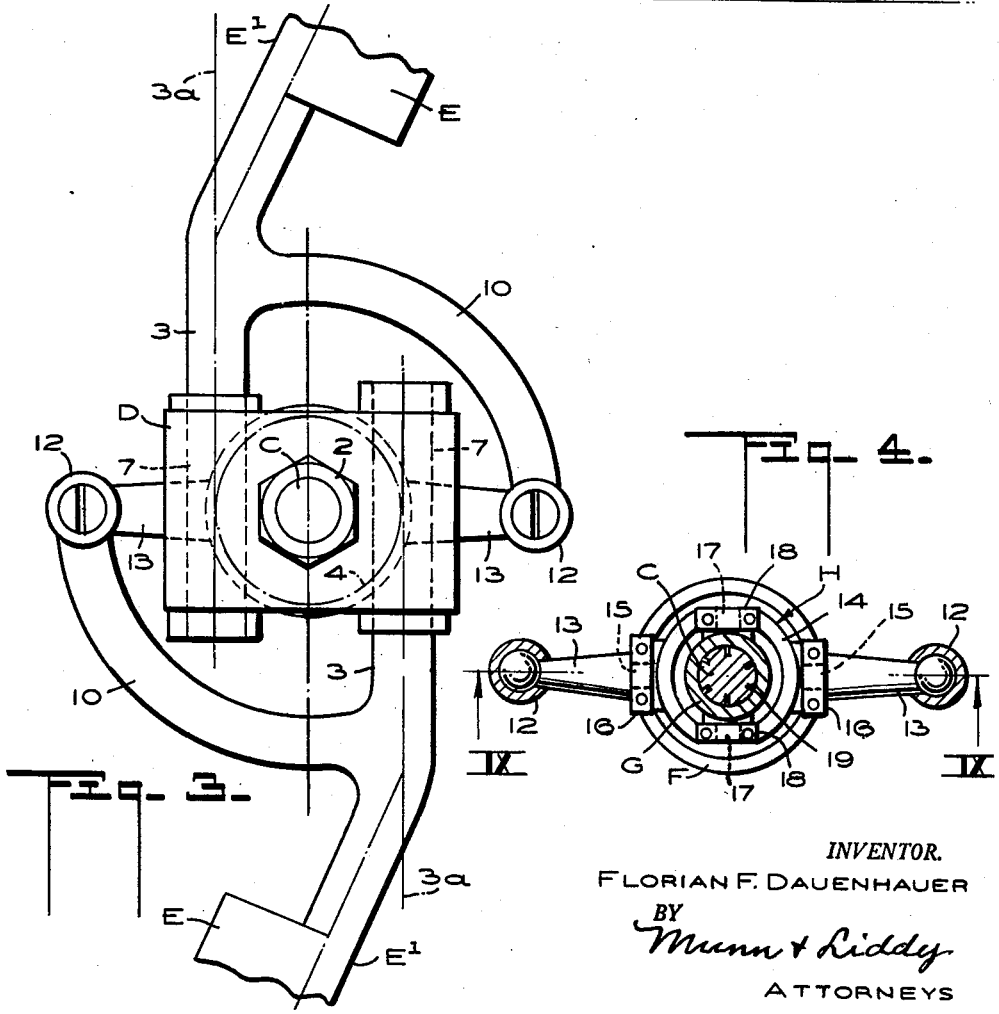
INVENTOR.
FLORIAN F. DAUENHAUER
BY
Munn + Liddy
ATTORNEYS

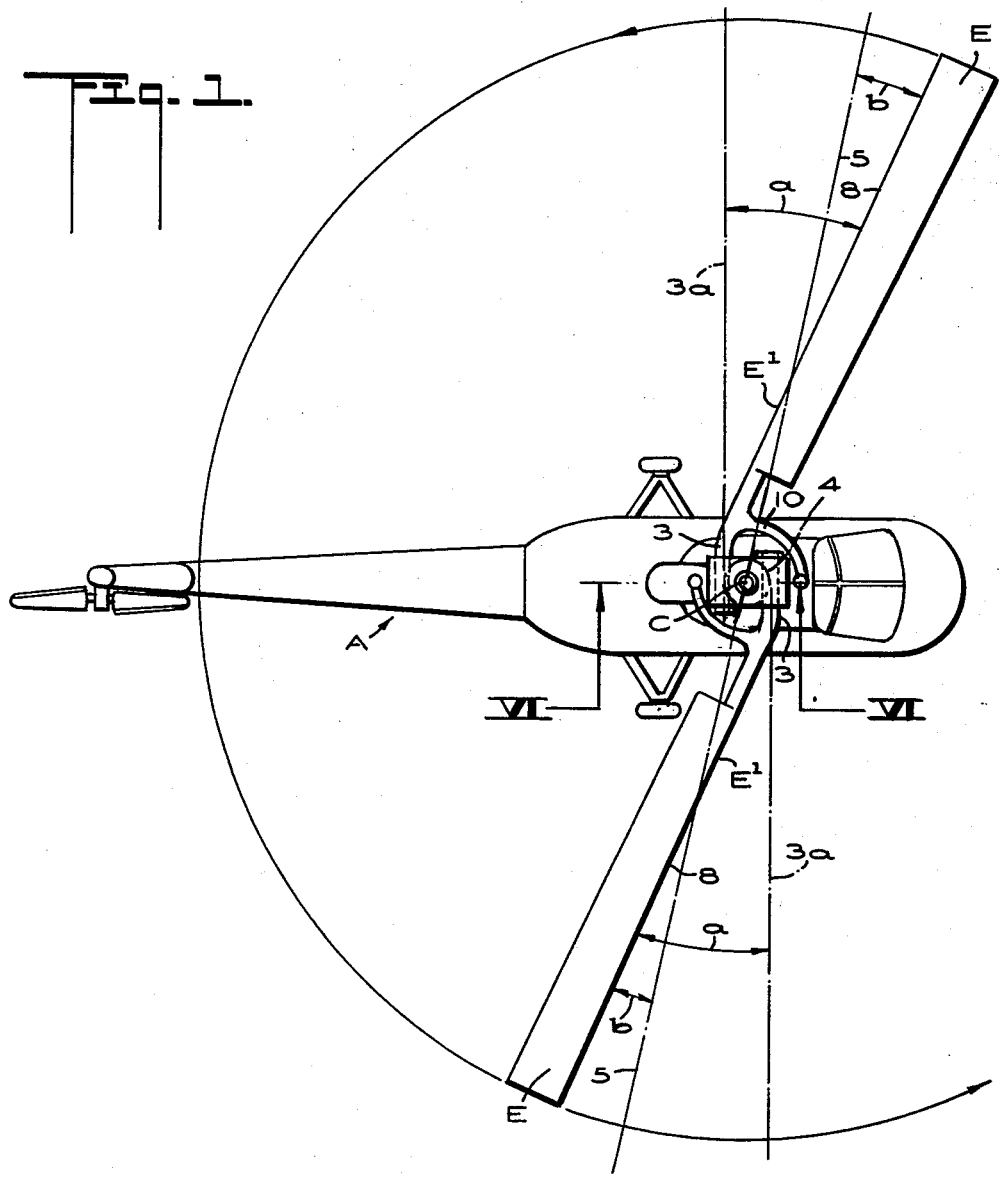

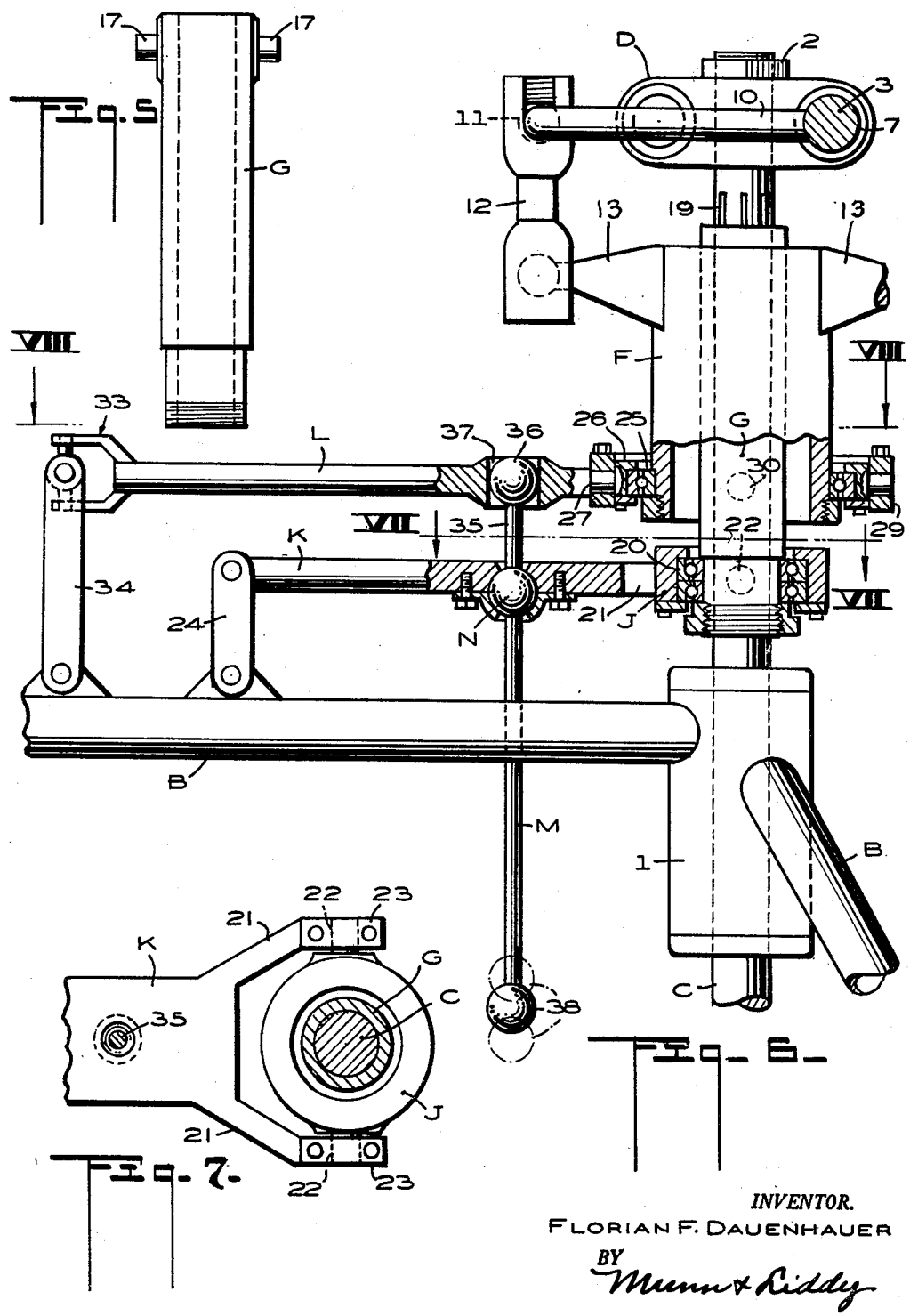

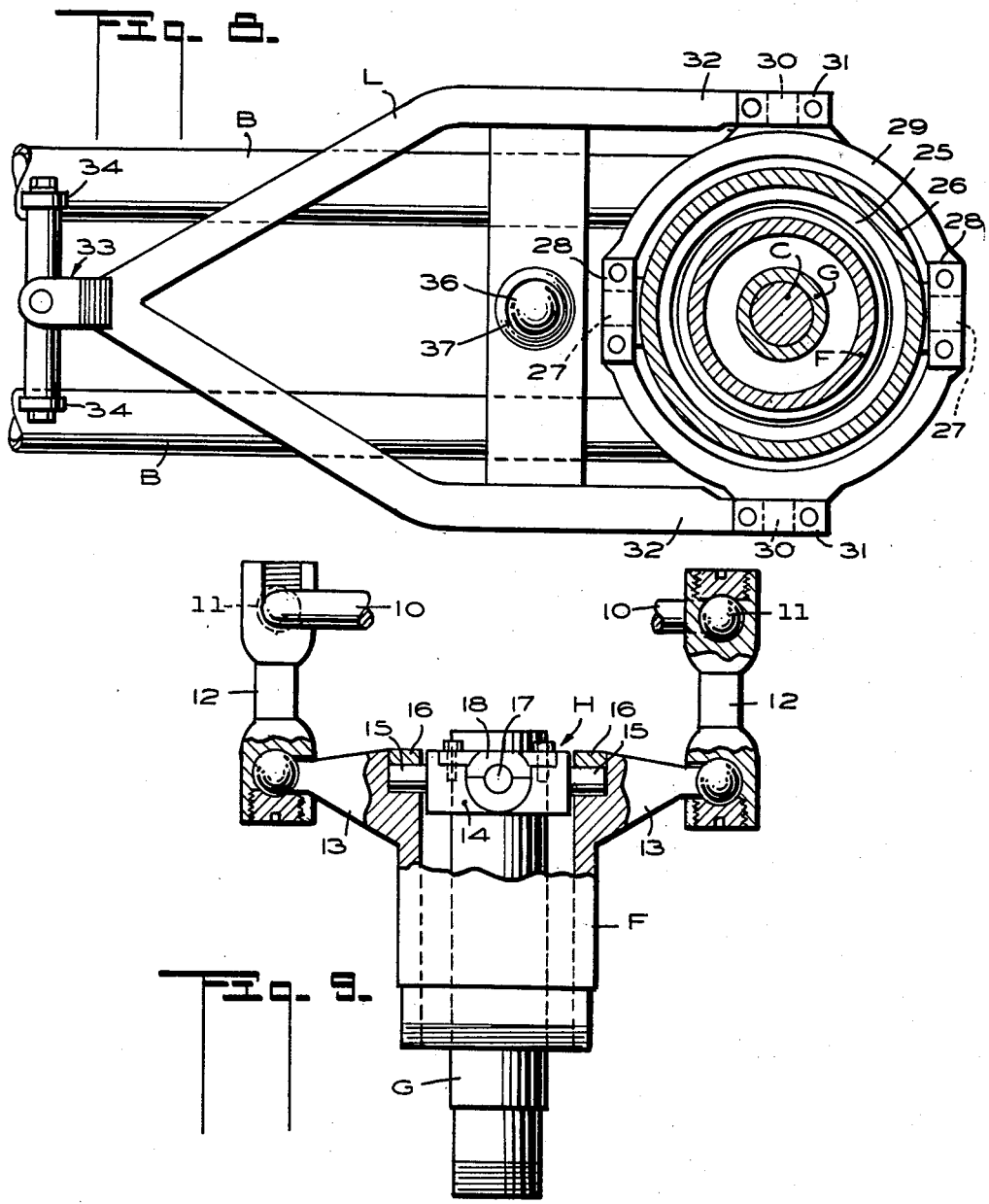

United States Patent Office 2,934,152
Patented Apr. 26, 1960

2,934,152

HELICOPTER LIFT ROTOR CONTROLS

Florian F. Dauenhauer, Santa Rosa, Calif.

Application April 16, 1956, Serial No. 578,307

3 Claims. (Cl. 170—160.25)

There are three basic types of helicopter lifting rotors. These are the hinged, or Cierva type; the semi-rigid, or Young type; and the rigid type. The rigid type lifting rotor is subject to very difficult vibration, control, and weight problems. Both the hinged type and semi-rigid type rotor normally use blades which are long and slender, that is, of high aspect ratio in comparison with propeller blades or airplane wings. Both of the latter mentioned lift rotors are normally controlled by the same type of controls. Collective pitch control is used in these rotors to control the magnitude of the rotor thrust while cyclic pitch control is used to control the direction of rotor thrust.

The blades of the hinged rotors are provided with two sets of hinges near their roots; one allowing up-and-down flapping motion of the blades, and the other allowing in-plane lagging motion of the blades. The flapping hinge is provided to eliminate any bending of the blade at the blade root, and thus allow the blades to attain an equilibrium between lift and centrifugal force. There are two reasons for the use of the lag hinge; the first and most obvious being the variation in blade drag which occurs in forward flight. The second is that the lag hinge relieves any bending moments at the root of the blade in the plane of rotation caused by this drag variation. Provision of the lag hinge permits the effective center of mass of the blade to maintain more nearly a constant rotational velocity. In their simplest form, the flapping or "delta" hinge axis lies in the plane of rotation and normal to the blade span axis, while the lag or "alpha" hinge axis is normal both to the plane of rotation and to the blade span axis.

One of the objects of the invention is to provide a helicopter lift rotor in which the lag hinge is dispensed with, but instead the blade has a swept-back angle which extends throughout the effective length of the blade. The root of each blade comprises a shank portion that extends at an angle to the lag or swept-back portion of the blade. The rigid shank portion is mounted in a header that is keyed to and rotated by the main power shaft of the helicopter lift. The rigid shank portion of the blade is offset radially from the vertical axis of the main shaft. All of the blades have the axes of their rigid shank portions lying in the same plane that extends at right angles to the axis of the power shaft and the rigid shank portion axes lie tangent to a circle whose center coincides with the center of the power shaft axis.

It will be seen from this blade structure that as each blade rotates about the axis of its rigid shank portion, the swept-back angle of the effective portion will swing in a cone whose center axis coincides with the axis of the rigid shank portion of the blade. Furthermore, the width of the effective portion of the blade will change its pitch as the blade has its rigid shank portion rotated in the bearing support provided in the cross head. The maximum pitch of the blade is reached when the leading edge of the swept-back portion of the blade lies in a plane that extends at right angles to the vertical axis of the main power shaft. The minimum pitch of the blade is approached as the rigid shank portion rotates in its bearing in the cross head and the swept-back portion of the blade is tilted upwardly due to the leading edge of the swept-back portion describing movement in the aforementioned cone whose axis coincides with the rigid shank blade portion axis.

A further object of my invention is to provide a helicopter lift control in which a single control handle may be actuated by the operator for causing the craft to move vertically up or down, to hover, or to move horizontally in any desired direction. The vertical movement of the craft is accomplished by moving the control handle vertically and the horizontal movement is accomplished by moving the handle in a horizontal direction.

A further object of my invention is to provide a helicopter lift control in which as the engine speed increases and the blades are rotated faster, the blades will assume an average position between lift and centrifugal force. The rotor is automatic in operation in that manual controls need not be operated to cause the aircraft to lift. The speed of the rotor determines the position of the blades in the lift and the blades are pulled into proper lift position by centrifugal force when power is applied. When the rotor is revolving slowly or has stopped from rotation, the blades will rest in the plane of rotation and will be at maximum pitch. As the blades are swung upwardly due to increased rotational speed or to the operator actuating the control handle, the pitch of the blades will decrease. The pitch of the blades is automatically changed as the blades are raised or lowered.

The feathering axis of each blade coincides with the axis of the rigid shank blade portion that is rotatably received in the header and is offset from the axis of rotation of the main power shaft. The swept-back portion of the blade is caused to swing upwardly or downwardly as the rigid shank portion is rotated in one direction or the other about its axis. This will cause the feathering axis to act also as the axis for the movement of the swept back blade portion as it changes its inclined position. The extent of the changing of the inclined angle of the blades with respect to a plane normal to the power shaft and their pitch is so arranged that in the plane of rotation which is at right angles to the power shaft, the blades will be at maximum pitch; and that as the blades swing upwardly above the right angle plane of rotation, the pitch will decrease and thus allow the blades to attain equilibrium between lift and centrifugal force.

The device has a safety feature in that the blades are so mounted that the updraft caused by the power-off descent, will turn the blades into a minimum pitch angle or autorotation position, thereby giving automatic autorotation and retarding the descent of the helicopter. One of the objects of my invention is to provide a helicopter lift rotor that is simple to operate, and one that will automatically feather the blades into autorotation position in the event of power failure for greater safety.

Other objects and advantages will appear as the specification proceeds. The novel features will be set forth in the claims hereunto appended.

Drawings

My invention is illustrated in the accompanying drawings, forming a part of this application, in which Figure 1 is a top plan view of a helicopter showing my helicopter lift control and rotor operatively applied thereto;

Figure 2 is a side elevation of Figure 1;

Figure 3 is a top plan view of the rotor head and portions of the blade supports on a larger scale and when looking in the direction of the arrows III—III of Figure 2;

Figure 4 is a horizontal section through the control on the same scale as Figure 3, and is taken along the line IV—IV of Figure 2;

Figure 5 is a side elevation of an inner control sleeve used in the device;

Figure 6 is a transverse section through the control unit on the same enlarged scale, and is taken along the line VI—VI of Figure 1;

Figure 7 is a horizontal section taken along the line VII—VII of Figure 6;

Figure 8 is a horizontal section taken along the line VIII—VIII of Figure 6; and Figure 9 is a vertical transverse section taken along the line IX—IX of Figure 4.

While I have shown only the preferred form of my invention, it should be understood that various changes, or modifications, may be made within the scope of the annexed claims without departing from the spirit thereof.

Specification

In carrying out my invention, I provide a helicopter indicated generally at A in Figures 1 and 2. The rotor and the control unit therefor form the subject matter of the present invention.

Referring to Figure 6, I indicate a frame B that forms a part of the internal structure of the helicopter A. The frame B supports a main bearing 1 for rotatably supporting a main shaft C for the helicopter rotor. The main shaft C projects above the top of the fuselage of the helicopter A and is provided with a rotor head D, see also Figure 3. The rotor head is rigidly secured to the shaft C so as to rotate therewith and is held in place by a lock nut 2, or other suitable fastening means.

Helicopter blades

It is best to describe the helicopter blades and how they are mounted and afterwards describe the operating mechanism for controlling the movement of the blades. The helicopter blades E are illustrated in Figures 1, 2 and 3, and two are shown although two or more may be used. In Figure 3, I show the rotor head D rotatably supporting the shanks 3 of the blades E. The shanks 3 are offset equal distances from the vertical axis of the main shaft C, and the axis 3a of the shanks 3 lie tangent to a circle 4 whose center coincides with the vertical axis of the main shaft. The two shanks 3 are arranged diametrically opposite from one another.

Figure 1 shows the blades E with their shanks 3 bent to provide a swept-back or lag portion E¹. Arcuate arrows a indicate the angle made between the feathering axes 3a and the leading edges of the swept-back blade portions E¹. Figure 3 shows the parts on a larger scale. A dot dash line 5 extends through the axis of the main shaft C, see Figure 1, and arcuate arrows b extend from the line 5 to the leading edges of the swept-back portions of the blades E¹. These arrows b show the blade angle of attack.

Referring to Figures 1 and 2, it will be noted that the lifting portion E¹ of the blade is not only swept back at an angle from the feathering axis 3a, but the spanwise axis of the blade (from front to rear of the blade), is tilted downwardly at an angle from the leading edge of the blade when the blade is at rest. The leading edge will lie in a plane that extends at right angles to the axis of the main shaft C when the blade is at rest, and the blade portion E¹ will be at a maximum pitch. The blades when rotated by the main shaft while they are in this position, will exert a maximum lift to the helicopter. The maximum lift position of the blade E is indicated by the dot dash line 6 in Figure 2 that defines a plane that extends at right angles to the axis of the main shaft C.

When the shanks 3 of the blades E are rocked in their bearings 7 by a means hereinafter described, the swept-back portions E¹ of the blades will have their leading edges 8 move through portions of cones whose axes are the feathering axes of the shanks 3, see Figure 1. The rocking of the blade shanks 3 in their bearings 7 will also rock the leading edges 8 of the blade portions E¹, and therefore the pitch of the blades will be reduced as the outer ends of the blades are raised. Figure 2 shows the blades E in a dot dash raised position and a dot dash line 9 that coincides with the blades when in raised position, indicates the minimum pitch of the blades E at this point.

The upward and downward swinging movement of the blades lies between the flat plane indicated by the dot dash line 6, and the inverted cone indicated by the dot dash line 9, and the angle between these two is about 18° in Figure 2. When the blades E are in their raised position as illustrated by the dot dash line 9, this is the position they will assume when the motor power, not shown, is cut off to the main shaft C and the helicopter starts on a "power-off" glide. The blades in such a position will be rotated by the updraft of air and the rotation of the blades due to this updraft of air is known as autorotation. The descent of the helicopter will be checked by the autorotation of the blades.

Helicopter blade lift control

The blades E carry pitch control arms 10 that are rigidly connected to the shanks 3 and extend rearwardly therefrom and form an arc of 90°, see Figure 3. In Figure 9, I show the outer ends of the arcuate arms 10 provided with spherical surfaces 11 and these form ball joints that connect the arms with downwardly extending ball joint links 12. The lower ends of the links 12 have a ball joint connection with radially extending arms 13 that extend outwardly from and are integral with a cyclic pitch control yoke F. The yoke F is in the shape of a cylinder or sleeve whose vertical axis coincides with the axis of the main shaft C, see Figure 4.

The yoke F or outer sleeve, is connected to an inner sleeve G by a universal joint H, see Figure 9. The upper ends of the two sleeves F and G are interconnected by the universal joint H. A ring 14 encircles the inner sleeve G and is spaced inwardly from the outer sleeve F. This ring carries outwardly extending and diametrically opposed trunnions 15, see both Figures 4 and 9, that are connected to the outer sleeve F by bearings 16 so that the outer sleeve is pivotally supported by these trunnions. The inner sleeve G has outwardly extending and diametrically opposed trunnions 17 that extend at right angles to the trunnions 15, see Figure 4, and are connected to the universal joint ring 14 by bearings 18. This construction permits the outer sleeve or yoke F to be swung into different angular positions with respect to the inner sleeve G while still rotating as a unit with the inner sleeve. The purpose of this will be explained hereinafter. The space between the two sleeves permits the outer one F to be swung into different angular positions with respect to the inner one G. A side elevation of the inner sleeve is illustrated in Figure 5.

The inner sleeve G is splined at 19, see Figure 4, to the main shaft C and this permits the sleeve to be moved vertically along the main shaft. Figure 6 shows the inner sleeve provided with a ball thrust bearing 20 at its lower end and this bearing is received in a housing J. A collective pitch control arm K, see Figures 6 and 7, has a yoke 21 that receives the thrust bearing housing J. The housing J has outwardly extending and diametrically opposed trunnions 22, see Figure 7, that are rotatably received in bearings 23 which connect the trunnions to the yoke 21. Links 24 pivotally connect the free end of the collective pitch control arm K to the frame B, see Figure 6.

Before describing the function of the arm K, it is best to set forth the mechanism for swinging the yoke F about its universal joint H and then show how both inner and outer sleeves G and F, respectively, are operated by a single control lever M. Again referring to Figure 6, and also Figure 8, it will be seen that I provide a cyclic pitch control yoke L. A bearing 25 is mounted at the lower end of the outer sleeve F and this bearing is carried in a housing 26. The housing has a universal connection with the yoke L.

In Figure 8, the bearing housing 26 is shown provided with outwardly extending and diametrically opposed trunnions 27 that are received in bearings 28, mounted on a ring 29. The ring in turn has outwardly extending and diametrically opposed trunnions 30 that are received in bearings 31, mounted on the arms 32 of the cyclic pitch control yoke L. The other end of the yoke L has a universal connection at 33 with links 34, see Figure 6, that in turn are connected to the frame B.

The control lever or handle M has a ball and socket joint connection at N with the collective pitch control arm K (see Figure 6). The lever M has an extension 35 that projects above the ball joint N and is provided with a ball 36 at its top. The yoke L has a cylindrical bore 37 for slidably receiving the ball 36. The lower end of the lever M is provided with a hand grasp knob or handle 38 by means of which the pilot controls the movements of the blades E.

It will be seen from this construction, that when the lever M is moved vertically upwardly or downwardly, as indicated by the dot dash lines of the handle 38 in Figure 6, the inner sleeve G will be moved along the splined main shaft C in either an upward or downward direction, because the ball will swing the collective pitch control arm K, which in turn will move the housing J and thrust bearing 20, in a vertical direction. When the inner sleeve G is moved upwardly, the outer sleeve F will also be moved upwardly therewith and will move the arms 13 and links 12 upwardly. The links in turn will rock the pitch control arcuate arms 10 and rotate the blade shanks 3 in their bearings for reducing the pitch of the blades E.

A downward movement of the lever M will have the opposite effect and will increase the pitch of the blades E. The ball 36 merely slides in the bore 37 if necessary, during the vertical movement of the lever M to alter the pitch of the blades. As the lever is raised or lowered, the arm K will be raised or lowered. Since the outer sleeve F moves upwardly or downwardly with the inner sleeve G, the yoke L will likewise be raised and lowered in unison with the arm K. The arm K and the yoke L swing about different centers when they move and that is why the ball 36 is permitted to slide in the bore 37.

The forward and rearward movement of the helicopter, as well as its lateral movement, is controlled by the pilot moving the handgrip 38 forwardly or rearwardly or moving it transversely in either direction. In fact the structure is such that the handgrip 38 can be moved in any direction in a horizontal plane through 360°. A combination of horizontal control and vertical lift or lowering, can be accomplished by the operator combining a vertical movement of the lever M, with a transverse movement at the same time.

Suppose the pilot moves the handgrip forwardly or to the right in Figure 6, the lever will fulcrum or pivot on the ball and socket joint N, and the top of the lever will be swung to the left. Therefore, the yoke L will be moved to the left with respect to the arm K. This will swing the lower end of the outer sleeve F to the left and will incline the axis of the sleeve so that the upper end of the sleeve will be inclined forwardly. The arms 13 are rigidly secured to the outer sleeve F, and therefore as the outer sleeve is rotated by its universal joint connection N with the inner sleeve G, the arms 13 will swing through a plane that is inclined with respect to the axis of the main shaft C.

It will be seen that the arms 13 will ride upwardly during one half or 180° of travel of the arms around the main shaft C, from the most forward position of the arms to the most rearward position; and then the arms will ride downwardly during the remaining half circle or 180° of travel. Therefore as one arm 13 travels upwardly from the front of the circle to the rear of the circle, it will progressively act on its associate arcuate blade arm 10 for reducing the pitch of the blade E connected to that arm. The blade swing is in a counterclockwise rotation when looking at Figure 1.

When one arm 13 moves upwardly as it swings from the front to the rear of the circle, the blade E connected to the arm will likewise swing through an arc of 180°, and during this movement the pitch of the blade will be reduced. At the same time, the other blade will be swinging through an angle of 180°, and its pitch will be gradually increased by its arm 13 riding downwardly and forwardly on the inclined circle. The greater pitch on the blades E as they swing through the front 180° of the circle and the less pitch on the blades during the remaining 180° swing, will cause the helicopter to move over the ground. It is possible to swing the lever M in any direction and this will incline the outer sleeve F in the opposite direction to that taken by the lever. The helicopter will move in any desired direction over the ground.

*Operation*

The main shaft C is rotated approximately between 260 and 300 r.p.m. The blades E are about sixteen to eighteen feet long. The rotor has automatic pitch control for the blades. When the blades are at rest, they will be at maximum pitch. I will first describe the action of the blades E when the outer sleeve F has its axis coinciding with the axis of the inner sleeve G, and with the axis of the main shaft C. As the rotor is started and the speed is increased, the maximum pitch of the blades will cause them to spiral upwardly. This upward swinging movement of the blades will cause their shanks 3 to rotate in their bearings 7. The rotation of the shanks is such as to decrease the pitch of the blades as the blades swing upwardly. The centrifugal force exerted on the blades due to their rotation, will tend to swing the blade length back into the plane 6 of rotation, see Figure 2. As the blade length swings downwardly due to centrifugal force, the pitch of the blade is automatically increased. These two forces of the pitch of the moving blade swinging the blade upwardly, and the centrifugal force exerted on the blade tending to move the blade downwardly, will balance each other and an equilibrium of the blade will be established where the blade will be at a certain pitch for the speed of the rotor. The "delta" slant or swept-back form of the blades E, causes them to operate automatically because they are at maximum pitch when at rest. The blades will commence moving upwardly as soon as the rotor starts to revolve. The swept-back blade eliminates the need of the "flapping" hinge which is now used in helicopter blades.

The vertical movement of the lever M gives collective pitch control. Pulling downwardly on the lever will increase the pitch angle of the blades and will cause the helicopter to rise vertically from the ground assuming that the rotor is revolving at sufficient speed. The inner sleeve G can be moved vertically on the main shaft through a distance of about two inches. No cyclic change in pitch of the blades will take place when the aircraft is moving vertically in either direction.

Cyclic pitch control is accomplished by moving the lever transversely in any desired direction, and this transverse movement can be done through a complete circle of 360°. The outer sleeve F can be tilted into any angle through 360° with rsepect to the vertical axis of the main shaft C. The helicopter has a single handle for controlling the collective pitch (which causes the helicopter to raise or lower or to hover); and cyclic pitch (which causes the helicopter to move in any desired direction while flying). A combination of collective pitch and cyclic pitch is possible by manipulating the lever to simultaneously move it vertically and transversely at the same time in order to move the lever to a predetermined point. When the lever M, is in a vertical position, only collective pitch control will result when the lever is moved vertically. When the lever M, is tilted into an angular position, then the outer sleeve F, will be tilted into an angular position and will impart cyclic pitch control to the blades.

There are a number of factors that come into play when the helicopter is caused to move over the ground while in flight. First, cyclic pitch affects the helicopter by exerting a greater lift on the half of the rotation in which the blades have the greater pitch; and correspondingly a lesser lift on the other half of the rotation in which the blades have a lesser pitch. This will cause the helicopter to tilt and the blade having the greater pitch will also exert directional push, following the line of least resistance.

Second, there is the gyroscopic force of the rotating blades to act on the direction in which the helicopter moves. Third, torque will also contribute its share of directional force. The final result will be a combination of all the forces brought into play, and the helicopter will move in the direction caused by these forces.

I have already referred to the pitch of the blades E, as being the greatest when the blades are in their lowest positions. When the main shaft C rotates the blades, they will be lifted because of the pitch of the blades, and they will rock about their shanks 3 in the bearings 7, and will reduce the angle of pitch. Therefore, as the speed of the rotor is increased, the more rapidly revolving blade will cut through the air faster, but the force of the lift will be reduced because the pitch of the blade will be reduced as the swept-back portion of the blade is inclined in an upward direction from a plan normal to the shaft C.

Another force comes into play as the rotor speed is increased and that is centrifugal force. This force will tend to swing the blades E downwardly toward the horizontal plane 6 in Figure 2, as the speed of the rotor is increased. We therefore have the pitch of the blades tending to lift them as the blades are moved and the pitch becomes less as the blades swing higher. We also have centrifugal force building up in the blades as the latter are rotated more rapidly, and this centrifugal force tends to swing the blades downwardly. An equilibrium of forces is established between the force tending to lift the blades and the centrifugal force tending to lower the blades and the result will be that the blades will be inclined at a pitch that will balance the lifting force with the downwardly pulling centrifugal forces.

It should be kept in mind that there will be no cyclic flapping of the blades if the aircraft moves vertically either up or down. When the axis of the outer sleeve F, coincides with the axis of the inner sleeve G, a movement of both sleeves along the main shaft C, will change the collective pitch of the blades. There will be no tendency for the blades to flap during each cycle because the aircraft is not moving transversely over the ground, but is merely ascending or descending.

I have already described how the lower end of the lever M can be moved to the right in Figure 6, for causing the aircraft to move through the air in the desired direction. The inclining of the outer sleeve F, to the right with respect to the inner sleeve G, will cause the arms 13 on the outer sleeve to revolve in an inclined plane. It might be well to explain further that if the right hand arm 13 in Figure 6, were at its lowest position due to the inclination of the outer sleeve F, it would act through its link 12, not shown in this figure, and on the arm 10 (also not illustrated in the same figure), to rock the blade E (that would extend away from the shaft C), so that this blade would be at its greatest pitch.

At the same time, the left hand arm 13 in Figure 6, will be at its highest position on the inclined plane, and therefore this arm will act through its link 12 to swing the arm 10, on the blade shank 3, shown in section in the figure, to rock the shank so that its blade E will be at the least pitch. The blades E will have their pitches continuously changed during each cycle between these two extreme positions so long as the outer sleeve F remains tilted with respect to the inner sleeve G. There will not be cyclic flapping of the blades E, because both are connected by appropriate linkage to the arms 13 that are integral with the outer sleeve F. There will be a cyclic change of pitch. Collective changing of the inclined angle the blades make with a plane normal to the shaft C, is made possible by the vertical adjustment of the lever M and the balancing of the lifting force, due to the pitch, of the blades, with the downward force, due to the centrifugal force that tends to swing the blades downwardly.

I claim:
1. In a helicopter lift rotor control; a vertical main power shaft; an inner sleeve splined to the power shaft for rotation therewith, but being slidable along the shaft; an outer sleeve encircling the inner sleeve; a universal joint interconnecting the two sleeves at their tops for permitting the outer sleeve to have its lower end swung into various angular positions through a complete circle of 360° with respect to the inner sleeve while still being rotated therewith; a head secured to the shaft and rotatable therewith; blades having shanks rotatably carried by the head and offset equal distances from the shaft axis; each blade shank being journalled for rotation about an axis located forwardly of the power shaft axis of rotation as viewed from above the head; the shank axes constituting feathering axes, and lying in a common plane that extends at right angles to the shaft axis, and being tangent to a circle whose center coincides with the shaft axis; said blades having swept-back portions whose leading edges extend at an angle to the shank axes; arms extending rearwardly from the blade shanks; a pair of trunnions extending radially from the outer sleeve; links interconnecting the trunnions with the arms so that vertical movement of the links will rock the arms and blade shanks; and common control means including a lever operatively connected to the two sleeves for raising or lowering the two sleeves as a unit when the lever is moved vertically for altering the collective pitch of the swept-back portions of the blades, the lower end of the lever being movable in a horizontal plane in any direction through a circle of 360° for changing the angle of the outer sleeve axis with respect to the inner sleeve axis; whereby the cyclic pitch of the blades is altered to cause the helicopter when in flight to move over the ground.

2. In a helicopter lift rotor: a main power shaft; an inner sleeve slidably mounted on the shaft and rotated thereby; an outer sleeve encircling the inner sleeve and being spaced therefrom; a universal joint interconnecting the two sleeves at their tops for causing the outer sleeve to rotate with the inner sleeve while permitting the outer sleeve to be inclined into various angular positions through a circle of 360° with respect to the inner sleeve; a head rotated by the shaft; blades having shanks rotatably carried by the head and offset equal distances from the shaft axis and lying in the same plane; each blade shank being journalled for rotation about an axis located forwardly of the power shaft axis of rotation as viewed from above the head; said blades having swept-back portions whose leading edges extend at an angle to the shank axes; the shank axes constituting feathering axes; arms extending from the shanks; a pair of trunnions extending radially from the outer sleeve; links interconnecting the trunnions with the arms so that vertical movement of the two sleeves with respect to the shaft will rock the blade shanks and alter the collective pitch of the blades, and an angular movement of the outer sleeve with respect to the inner sleeve, will alter the cyclic pitch of the blades; a cyclic pitch control yoke operatively connected to the outer sleeve for inclining the outer sleeve in any desired direction in a circle of 360°; a collective pitch control arm operatively connected to the inner sleeve for moving it up or down on the shaft; and a common control lever having a universal connection with the cyclic pitch control yoke and a universal connection with the collective pitch control arm while being supported by the latter and being movable vertically to as to move the inner sleeve in the desired direction along the shaft for changing the collective pitch of the blades; said common control lever also being swingable laterally about its connection with the control arm as a pivot for moving the cyclic pitch control yoke and causing the latter to swing the outer sleeve into the desired angular position with respect to the main shaft for changing the cyclic pitch of the blades; said common control lever being movable for simultaneously moving the cyclic pitch control yoke and the collective pitch control arm for simultaneously altering the cyclic and collective pitch of the blades.

3. In a helicopter lift rotor: a main power shaft; a head rigidly secured to the shaft and having a plurality of bearings whose axes lie in a common plane that extends at right angles to the axis of the shaft; a plurality of blades having shanks rotatably received in the bearings; the axes of the shank portions received in the bearings being offset equal distances from the shaft axis and lying tangent to a circle whose center coincides with the shaft axis; each blade shank being journalled for rotation about an axis located forwardly of the power shaft axis of rotation as viewed from above the head; said blades having swept-back portions with leading edges that extend at an angle to the shank portions; the outer end on each leading edge lying on a radius line from the axis of rotation that extends throughout the entire length of the swept-back blade portion; and means for rotating the shaft and blades in a certain direction; the entire length of the leading edge of each blade with the exception of the outer end thereof lying ahead of said radius line when considering the direction of rotation of the blades.

References Cited in the file of this patent

UNITED STATES PATENTS

| | | |
|---|---|---|
| 1,992,015 | Rutherford et al. | Feb. 19, 1935 |
| 2,430,767 | Hirsch | Nov. 11, 1947 |
| 2,606,622 | Bates | Aug. 12, 1952 |
| 2,670,804 | Campbell | Mar. 2, 1954 |
| 2,755,869 | Magill | July 24, 1956 |